US009892752B1

United States Patent
Chu et al.

(10) Patent No.: US 9,892,752 B1
(45) Date of Patent: Feb. 13, 2018

(54) SELECTING A MAXIMUM LASER POWER FOR A CALIBRATION BASED ON A PREVIOUSLY MEASURED FUNCTION

(71) Applicant: Seagate Technology LLC, Cupertino, CA (US)

(72) Inventors: Alfredo Sam Chu, Prior Lake, MN (US); Siew Kin Chow, Shakopee, MN (US); Franklin P. Martens, Bloomington, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 15/623,777

(22) Filed: Jun. 15, 2017

(51) Int. Cl.
*G11B 7/00* (2006.01)
*G11B 7/1263* (2012.01)
*G06F 11/07* (2006.01)
*G11B 5/012* (2006.01)
*G11B 20/18* (2006.01)
*G11B 5/00* (2006.01)

(52) U.S. Cl.
CPC ......... *G11B 7/1263* (2013.01); *G06F 11/076* (2013.01); *G06F 11/0727* (2013.01); *G11B 5/012* (2013.01); *G11B 20/1816* (2013.01); *G11B 2005/0021* (2013.01)

(58) Field of Classification Search
None
See application file for complete search history.

(56) References Cited

U.S. PATENT DOCUMENTS

| | | | |
|---|---|---|---|
| 5,341,360 A | 8/1994 | Johann et al. | |
| 5,513,166 A | 4/1996 | Tokumitsu et al. | |
| 6,525,892 B1 | 2/2003 | Dunbar et al. | |
| 7,099,251 B2 | 8/2006 | Naoi et al. | |
| 7,990,647 B2 | 8/2011 | Lille | |
| 8,760,779 B2 | 6/2014 | Johns et al. | |
| 8,787,125 B1 * | 7/2014 | Lee | G11B 5/607 369/13.26 |
| 8,854,929 B1 | 10/2014 | Champion et al. | |
| 8,929,186 B1 * | 1/2015 | Sharma | G11B 5/012 369/47.5 |
| 9,013,966 B1 * | 4/2015 | Matsumoto | G11B 5/23 369/13.17 |
| 9,093,091 B1 | 7/2015 | Chu et al. | |
| 9,099,103 B1 | 8/2015 | Krichevsky | |

(Continued)

OTHER PUBLICATIONS

U.S. Appl. No. 15/139,432, filed Apr. 27, 2016, Chu et al.

*Primary Examiner* — Peter Vincent Agustin
(74) *Attorney, Agent, or Firm* — Hollingsworth Davis, LLC

(57) ABSTRACT

An operational laser power for a heat-assisted, magnetic recording head is selected based on a function of a write quality metric versus laser power. The write quality metric of data written to a magnetic recording medium is monitored at the operational laser power. Responsive to the write quality metric satisfying a threshold, a power difference between the operational laser power and an offset laser power is determined. The offset laser power corresponds to a point of the function where the write quality metric is approximately equal to the threshold. A maximum laser power is set for a calibration operation. The maximum laser power is based on the sum of the operational laser power and the power difference.

20 Claims, 8 Drawing Sheets

(56) References Cited

U.S. PATENT DOCUMENTS

| | | | |
|---|---|---|---|
| 9,361,920 B1 | 6/2016 | Zhu et al. | |
| 9,472,212 B2 | 10/2016 | Ma et al. | |
| 9,472,219 B1 | 10/2016 | Raghunathan | |
| 2001/0036136 A1* | 11/2001 | Fukushima | G11B 7/007 369/53.18 |
| 2004/0075931 A1* | 4/2004 | Kim | G11B 5/012 360/66 |
| 2004/0156293 A1* | 8/2004 | Pozidis | G11B 20/10009 369/59.22 |
| 2005/0213460 A1* | 9/2005 | Ohkubo | G11B 7/0062 369/59.11 |
| 2007/0081434 A1* | 4/2007 | Wang | G11B 7/00456 369/47.41 |
| 2007/0201585 A1* | 8/2007 | Feng | G11B 20/10009 375/341 |
| 2009/0225639 A1* | 9/2009 | Miyashita | G11B 20/10009 369/53.11 |
| 2010/0083295 A1* | 4/2010 | Eto | G11B 7/00736 720/695 |
| 2010/0260025 A1* | 10/2010 | Minemura | G11B 20/10009 369/59.22 |
| 2010/0284257 A1* | 11/2010 | Nakamura | G11B 7/1267 369/53.16 |
| 2011/0205861 A1 | 8/2011 | Erden et al. | |
| 2012/0250480 A1* | 10/2012 | Kurokawa | G11B 7/00456 369/47.28 |
| 2013/0077453 A1* | 3/2013 | Alex | G11B 5/02 369/13.26 |
| 2014/0119164 A1 | 5/2014 | Wilson et al. | |
| 2015/0109701 A1* | 4/2015 | Brunnett | G11B 20/1217 360/77.05 |

\* cited by examiner

| Lookup Table | | | | | | | | | |
|---|---|---|---|---|---|---|---|---|---|
| Function 700 | | Function 701 | | Function 702 | | Function 703 | | Function 704 | |
| top_BER_Start | | top_BER_deg1 | | top_BER_deg2 | | top_BER_deg3 | | top_BER_deg4 | |
| 106 | -1.261 | 121 | -1.277 | 135 | -1.291 | 146 | -1.431 | 155 | -1.681 |
| 107 | -1.410 | 122 | -1.423 | 136 | -1.508 | 147 | -1.600 | 156 | -1.759 |
| 108 | -1.521 | 123 | -1.617 | 137 | -1.675 | 148 | -1.719 | 157 | -1.847 |
| 109 | -1.705 | 124 | -1.761 | 138 | -1.821 | 149 | -1.804 | 158 | -1.874 |
| 110 | -1.855 | 125 | -1.929 | 139 | -1.958 | 150 | -1.906 | 159 | -1.933 |
| 111 | -2.034 | 126 | -2.029 | 140 | -2.033 | 151 | -2.020 | 160 | -1.980 |
| 112 | -2.190 | 127 | -2.164 | 141 | -2.164 | 152 | -2.123 | 161 | -1.997 |
| 113 | -2.285 | 128 | -2.280 | 142 | -2.305 | 153 | -2.209 | 162 | -1.996 |
| 114 | -2.395 | 129 | -2.383 | 143 | -2.382 | 154 | -2.281 | 163 | -1.970 |
| 115 | -2.492 | 130 | -2.443 | 144 | -2.442 | 155 | -2.301 | 164 | -1.937 |
| 116 | -2.564 | 131 | -2.524 | 145 | -2.469 | 156 | -2.342 | | |
| 117 | -2.632 | 132 | -2.555 | 146 | -2.515 | 157 | -2.380 | | |
| 118 | -2.666 | 133 | -2.629 | 147 | -2.548 | 158 | -2.394 | | |
| 119 | -2.727 | 134 | -2.663 | 148 | -2.570 | 159 | -2.403 | | |
| 120 | -2.764 | 135 | -2.691 | 149 | -2.578 | 160 | -2.395 | | |
| 121 | -2.799 | 136 | -2.728 | 150 | -2.593 | 161 | -2.379 | | |
| 122 | -2.830 | 137 | -2.738 | 151 | -2.572 | 162 | -2.345 | | |
| 123 | -2.847 | 138 | -2.752 | 152 | -2.554 | | | | |
| 124 | -2.848 | 139 | -2.738 | 153 | -2.525 | | | | |
| 125 | -2.850 | 140 | -2.749 | | | | | | |
| 126 | -2.853 | 141 | -2.725 | | | | | | |
| 127 | -2.834 | 142 | -2.699 | | | | | | |
| 128 | -2.802 | | | | | | | | |

*FIG. 8*

SELECTING A MAXIMUM LASER POWER FOR A CALIBRATION BASED ON A PREVIOUSLY MEASURED FUNCTION

SUMMARY

The present disclosure is directed to selecting a maximum laser power for a calibration based on a previously measured function. In one embodiment, a method involves selecting an operational laser power based on a first function of a write quality metric versus laser power for a heat-assisted, magnetic recording head. The operational laser power is used for recording based on the function. The write quality metric of data written to a magnetic recording medium is monitored at the operational laser power. Responsive to the write quality metric satisfying a threshold, determining a power difference between the operational laser power and an offset laser power. The offset laser power corresponds to a point of the first function where the write quality metric is approximately equal to the threshold. A maximum laser power for a calibration operation is set to at least a sum of the operational laser power and the power difference. Different laser powers are applied to the recoding head during the calibration operation to select a new laser power that improves the quality metric. The different laser powers do not exceed the maximum laser power.

In another embodiment, results of a first laser calibration are recorded as a function of bit-error-rate versus laser power for a recording head. An operational laser power is selected from a first point in the function having a minimum bit-error-rate. During operation subsequent to the first laser calibration, a tested bit-error-rate of data recorded by the recording head to a recording medium is monitored. Responsive to the tested bit-error-rate being above a threshold, a second laser calibration is performed that involves sweeping through different laser powers within a single track of the recording medium. The different laser powers not exceeding a maximum laser power. The maximum laser power includes the operational laser power plus a difference between the operational laser power and an offset laser power of a second point in the function. A bit-error-rate of the second point in the function is greater than or equal to the threshold. The operational laser power is changed to correspond to a second minimum bit-error-rate found during the second laser calibration.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures. The figures are not necessarily to scale.

FIG. 8 is a table showing the data of the graph in FIG. 7;

DETAILED DESCRIPTION

Figure 1:
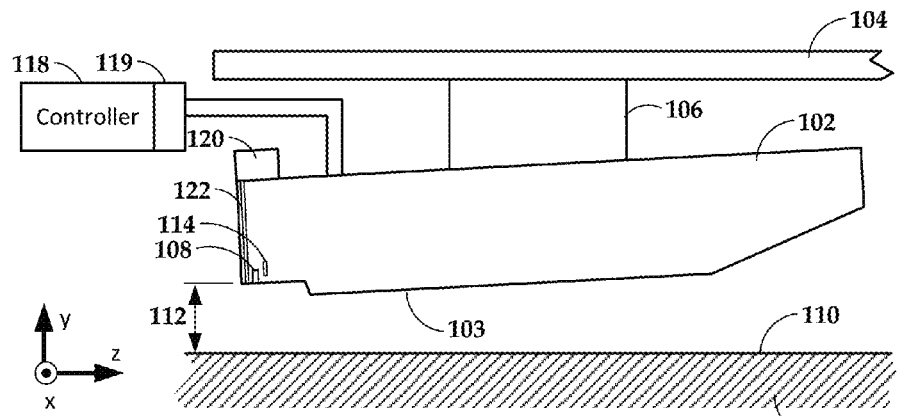
FIG. 1 is a block diagram of a hard disk drive slider and media arrangement according to an example embodiment.

The present disclosure generally relates to data storage devices that utilize magnetic storage media, e.g., disks. In some embodiments below, the devices use heat-assisted magnetic recording (HAMR), also referred to as energy-assisted magnetic recording (EAMR), thermally-assisted magnetic recording (TAMR), and thermally-assisted recording (TAR). This technology uses an energy source such as a laser to create a small hotspot on a magnetic disk during recording. The heat lowers magnetic coercivity at the hotspot, allowing a write transducer to change magnetic orientation, after which the hotspot is allowed to rapidly cool. Due to the relatively high coercivity of the medium after cooling, the data is less susceptible to data errors due to thermally-induced, random fluctuation of magnetic orientation known as the superparamagnetic effect.

A laser or other energy source may be directly (e.g., surface-attached) or indirectly (e.g., via optical fiber) coupled to a HAMR read/write head. An optical path (e.g., waveguide) is integrated into the read/write head and delivers the light to a media-facing surface of the read/write head. Because the size of the desired hotspot (e.g., 50 nm or less) is smaller than half a wavelength of the laser light (e.g., 800-1550 nm), conventional optical focusers (e.g., lenses) are diffraction limited and cannot be used to focus the light to create the hotspot. Instead, a near-field transducer (NFT) is employed to direct energy out of the read/write head.

Generally, the NFT is formed by depositing a thin-film of material such as gold, silver, copper, etc., a region of near an integrated optics waveguide or some other delivery system. When exposed to laser light that is delivered via the waveguide, the light generates a surface plasmon field on the NFT. The NFT is shaped such that the surface plasmons are directed out of a surface of the write head onto a magnetic recording medium to form a hot spot used during recording.

In a HAMR drive, a number of performance criteria (e.g., areal density, track width, bit error rate) are affected by the size and the intensity of the hotspot created via the NFT. To control at least the size of the hotspot, one variable that can be changed by drive control systems is power supplied to the laser (or other energy device). In the factory, the setting of the laser power (e.g., current) to an optimal level is one of the earlier calibrations performed, as subsequent testing that involves writing to the recording medium will require the laser to be operating properly to heat the recording medium while writing test data.

In the factory process, thousands of drives may be tested on a daily basis, and so there are benefits in reducing the time needed to perform laser calibration. In the field when the laser current needs to be re-calibrated (e.g., due to the NFT and/or laser diode aging), it is also beneficial to reduce the time to perform the current re-optimization, as this can impact availability of the drive. In this disclosure, methods and apparatuses are described to optimize laser power by using a different laser power to write different sequential parts of a track. For example, different laser current may be used for writing each data wedge around the track, to write each short sector after every servo sector, and/or to write every other wedge around a track. In order to prevent damage to the optical components during this process, a method is described to set a maximum laser power during the laser power optimization.

In reference now to FIG. 1, a block diagram shows a side view of a read/write head 102 according to an example embodiment. The read/write head 102 may be used in a magnetic data storage device, e.g., HAMR hard disk drive. The read/write head 102 may also be referred to herein as a slider, write head, read head, recording head, etc. The read/write head 102 is coupled to an arm 104 by way of a suspension 106, e.g., a gimbal. The read/write head 102 includes read/write transducers 108 at a trailing edge that are held proximate to a surface 110 of a magnetic recording medium 111, e.g., a magnetic disk. When the read/write head 102 is located over surface 110 of recording medium 111, a flying height 112 is maintained between the read/write head 102 and the surface 110 by a downward force of arm 104. This downward force is counterbalanced by an air cushion that exists between the surface 110 and an air bearing surface (ABS) 103 (also referred to herein as a "media-facing surface") of the read/write head 102 when the recording medium 111 is rotating.

A controller 118 is coupled to the read/write transducers 108, as well as other components of the read/write head 102, such as clearance-control heaters 114, sensors, etc. The controller 118 may be part of general- or special-purpose logic circuitry that controls the functions of a storage device that includes at least the read/write head 102 and recording medium 111. The controller 118 may include or be coupled to a read/write channel 119 that include circuits such as preamplifiers, buffers, filters, digital-to-analog converters, analog-to-digital converters, decoders, encoders, etc., that facilitate electrically coupling the logic of the controller 118 to the signals used by the read/write head 102 and other components. Among other things, the controller 118 is configured to perform a calibration procedure described in greater detail below.

The illustrated read/write head 102 is configured as a HAMR device, and so includes additional components that form a hot spot on the recording medium 111 near the read/write transducer 108. These components include a laser 120 (or other energy source) and a waveguide 122. The waveguide 122 delivers light from the laser 120 to components near the read/write transducers 108. For example, a write transducer of the read/write transducers 108 includes an NFT located near a magnetic write pole. A read transducer of the read/write transducers 108 may be configured as a magnetoresistive stack (e.g., giant magnetoresistive, tunnel magnetoresistive, etc.) surrounded by magnetic shields.

In a HAMR write head, one approach to setting laser current values is to write data to the recording medium at different power levels, e.g., changing inputs to a digital-to-analog converter (DAC) that sets current levels applied to the laser via a preamplifier. After writing data to the recording medium, the data is read back to find an optimal current, e.g., a minimum amount of laser current that provides desired characteristic such as amplitude, bit-error-rate (BER), adjacent track erasure, signal-to-noise ratio (SNR), etc. In order to try as many settings as possible in the least amount of time, a method and apparatus as described below sets a plurality of different laser currents within a single rotation in which a single track is written.

Figure 2A:
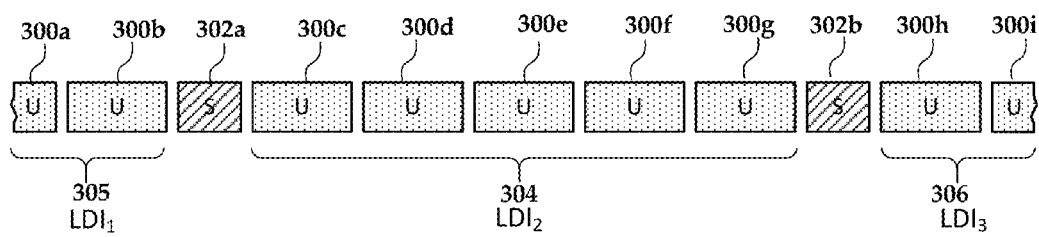
FIGS. 2A, 2B, 3, 4, and 5 are block diagrams showing a calibration operating on portions of test tracks according to example embodiments.

An example embodiment of writing test data at different laser power levels is shown in the block diagram of FIG. 2A. In this diagram, data sectors 300a-i are arranged between servo marks 302a-b. For purposes of this disclosure, the region between two servo marks will be referred to as a wedge or user data wedge. A wedge may contain more than one sector (e.g., for small sectors such as 512 byte sectors) or a sector may encompass multiple wedges (e.g., for large sectors such as 4096 byte sectors). In this example, one full wedge 304 and two partial wedges 305, 306 are shown, and each wedge has five user data sectors 300c-300g for purposes of illustration. In practice, a different number of sectors (including partial sectors) may be arranged between servo marks, and the number of sectors-per-wedge may vary based on the radial distance of the track from the center of the disk.

The servo marks 302a-b contain data used by the servo control system to accurately position the read/write head over a track. The servo marks 302a-b are prewritten onto the disk during manufacturing, and the drive is programmed to ensure that the servo marks aren't overwritten during use. The data sectors 300a-i include written user data, and may correspond to a logical sector/address used by a host. As indicated by the laser diode current values $LDI_1$-$LDI_3$, the data is written to each wedge 304-306 using a different laser current. This may also involve adjusting, for each wedge 304-306, a clearance actuator (e.g., an embedded heater) to compensate for changes in laser-induced protrusion at the different laser current levels. Any data (e.g., a 2T tone, 3T tone, multi-frequency tone) may be written to the wedges 304-306, and reading back the data will provide a data point for each wedge from which to determine the optimum laser current levels. While this and other examples describe applying different currents and determining an optimal laser current, generally it will be understood that these examples can be extended to applying any combination of changing voltage and current that result in an optimal laser power.

Figure 2B:
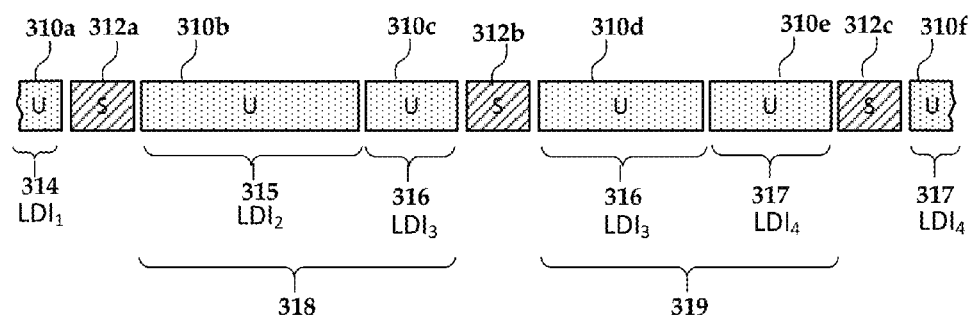

The block diagram of FIG. 2B shows another example embodiment of writing test data at different laser power levels. Data regions 310a-f are arranged between servo marks 312a-c. The regions 310a-f may be wholly or parts of different sectors 314-317 or other units of data. The sectors 314-317 may be discontinuous across servo marks 312a-c. For example, regions 310c-d are part of the same sector/unit 316, but are separated by servo mark 312b. As before, the region between two servo marks will be referred to as a user data wedge, e.g., regions 318, 319 represents two user data wedges. As indicated by the laser diode current values $LDI_1$-$LDI_4$, the data is written to each sector 314-317 using a different laser current. Because the sectors 314-317 may span two wedges 318, 319, this will involve not only writing to each wedge 318, 319 at a different current, but will involve writing at two different currents within each wedge.

Figure 3:
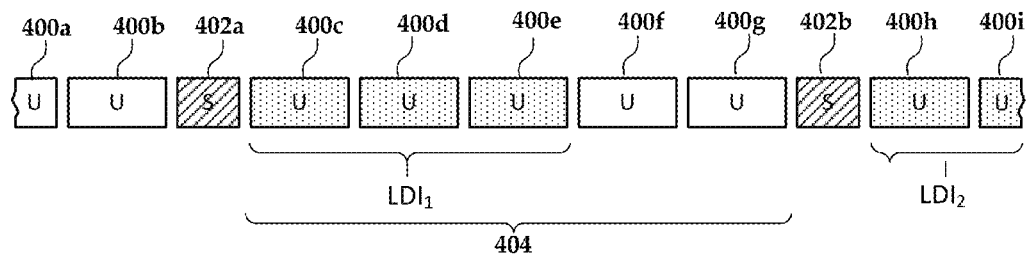
Figure 4:
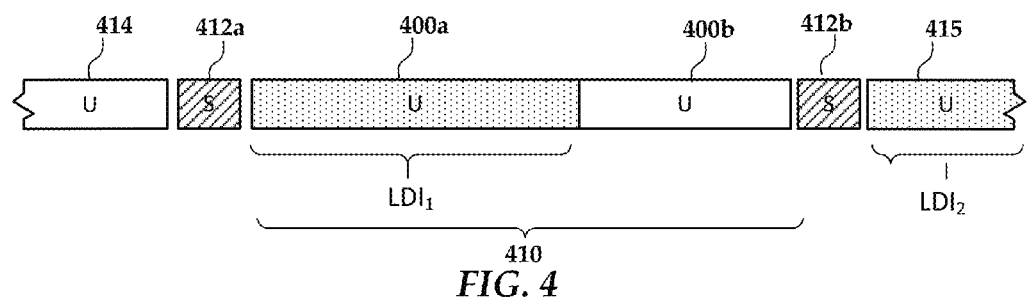
Figure 5:
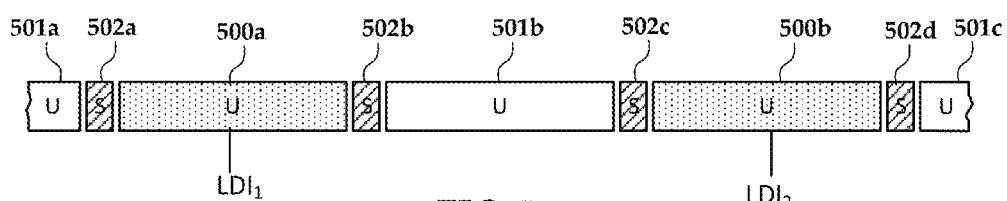

In the example shown in FIGS. 2A and 2B, it is assumed there is no write coupling interference when writing and programming the preamplifier registers for the next level while writing at a current level. If there is write coupling interference, test data may be written as shown in FIGS. 3, 4, and 5, which are block diagrams of test data according to other example embodiments. In FIG. 3, user data sectors 400a-i are written between servo marks 402a-b. User data sectors 400c-e of wedge 404 are written using laser current level $LDI_1$ and at least the laser is turned off while traversing sectors 400f-g. Other components may also be turned off while traversing sectors 400f-g, such as write coil and write heater. This is repeated for prior and/or subsequent wedges, e.g., sectors 400h-i of the next wedge are written using laser current level $LDI_2$ and at least the laser is turned off while traversing prior sectors 400a-b. The time spent traversing unwritten sectors (e.g., sectors 400a-b and 400f-g) can be used to update the preamp registers that control the laser current and heater power.

In FIG. 4, the writer is set up for a data partition track format referred to as single-sector-per-wedge or super-sector format. In this format, each wedge (e.g., wedge 400) between servo marks (e.g., servo marks 412a-b) encompasses a single sector (or less than one sector). Portion 400a of wedge 400 is written using laser current level $LDI_1$ and at least the laser is turned off while traversing portion 400b. Other components may also be turned off while traversing portion 400b, such as write coil and write heater. This is repeated for prior and/or subsequent wedges, e.g., the first part of the next wedge 415 is written using laser current level $LDI_2$ and at least the laser is turned off while traversing the last part of previous wedge 414. The time spent traversing unwritten wedge portions can be used to update the preamp registers that control the laser current and heater power.

In both FIGS. 3 and 4, a beginning portion of each of the wedges is written with data and an ending portion of each of the wedges is not written to. It will be understood that other portions may be written. For example, the beginning portion of each wedge may be not written to while the ending portion is written to. In such a case, the laser current for the ending portion may be set while traversing the beginning portion. In other embodiments a middle portion of each wedge may be written to, and adjacent beginning and ending portions are not written to.

In the example shown in FIG. 5, user data wedges 500a-b and 501a-c are located between servo marks 502a-d. The wedges 500a-b and 501a-c may include multiple sectors or be configured as super-sectors. Wedges 500a-b are written using laser current levels $LDI_1$ and $LDI_2$, respectively. At least the laser is turned off while traversing wedges 501a-c that are interleaved between wedges 500a-b. Other components may also be turned off while traversing wedges 501a-c, such as write coil and write heater. This is repeated for subsequent wedges, e.g., alternating between writing wedges between two servo marks then skipping writing for the adjacent wedge between the next two servo marks. The time spent traversing unwritten wedges 501a-c can be used to update the preamp registers that control the laser current and heater power.

Once an optimal laser power is found in the examples above, it may be used as a nominal laser power, e.g., optimal power defines a nominal current setting used for recording data via the read/write head. Note that the actual laser current may change based on operating conditions, e.g., ambient temperature, localized heating, the current zone being recorded, different modes, etc. As such, a laser control system may define a nominal current at a predefined operating point, and then make adjustments to the laser current based on present operating conditions.

In the above laser calibration operations, there are situations where the laser is supplied with too much current, which could damage some components in the read/write head. When full tracks are being recorded with a single laser power, each track can be read to find BER (or other quality measure) after recording the track but before recording another track at a higher laser power. If the BER fails to improve after some number of iterations, it may be assumed that the laser is at the optimal power and the iterations stopped. In this way, the increase of laser current is stopped based on a direct measurement of performance. However, this may not be possible when performing an accelerated calibration as described above.

When performing single-track sweeps that record the various wedge patterns shown in FIGS. 2A-5, the laser power is set to a range and the recorded data is not read back until all of the wedges are written up to the highest laser power in the range. Without knowing an allowable upper limit of laser power, it is possible to damage components such as the NFT if laser power is increased beyond some level. While such level can be known for a new device, e.g., based on a factory calibration, the optical efficiency of the read/write head may change over time, thereby requiring less or more laser power for best recording results. For example, over time the NFT and/or other optical transmission components in the head may become less or more efficient, thereby requiring more or less laser current, respectively, to write the recording medium. Because the NFT is located at the region with maximum energy density, it can be susceptible to damage if the localized energy provided by the laser exceeds some value.

In order to prevent damage to optical head components during a factory or field laser calibration, an apparatus may utilize a function obtained from a previous calibration to determine a safe maximum value for a subsequent calibration that involves a multi-laser-power-per-track sweep. After examining multiple numbers of heads as they degrade, it has been found that the gradient of the BER versus laser current curves have similar characteristics even after significant degradation. Therefore, a previous BER versus laser current curve can be used to predict the laser current range for the next calibration sweep.

Figure 6:
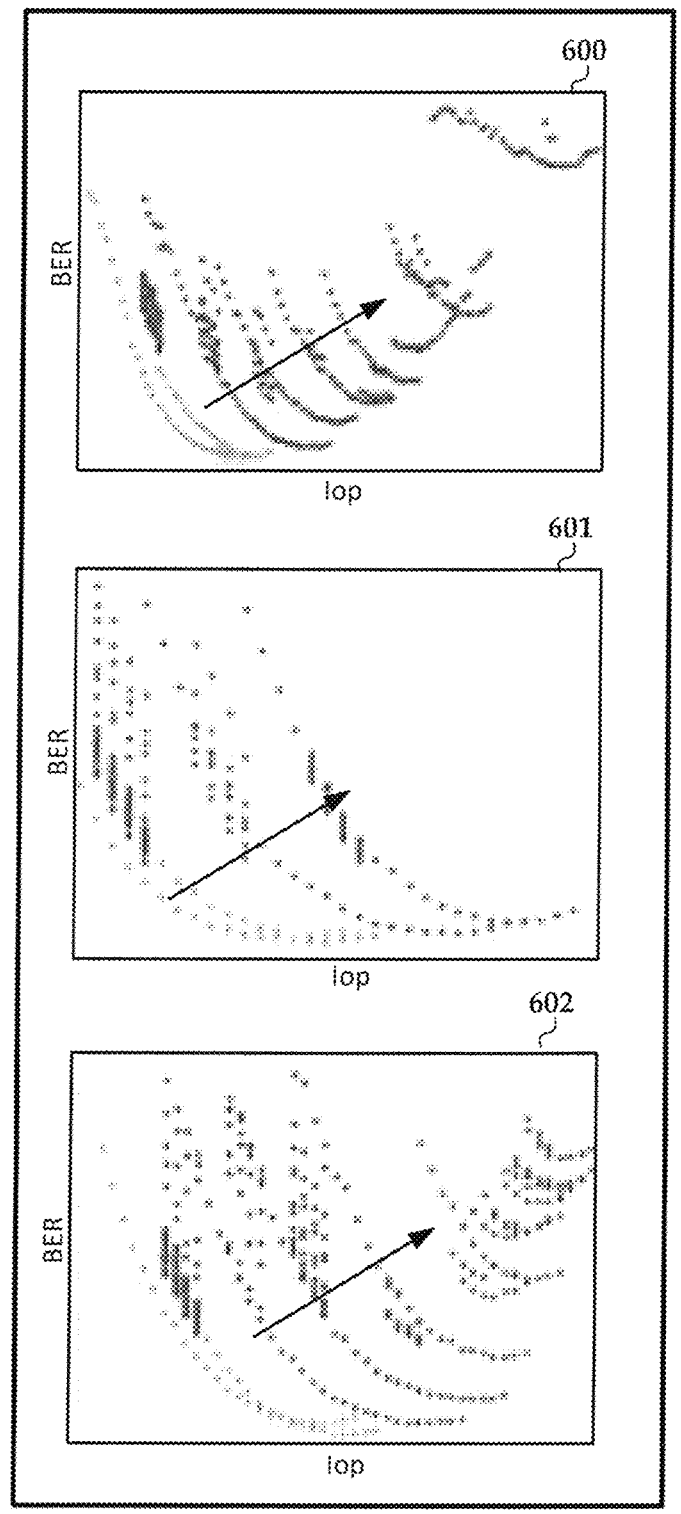
FIG. 6 is a set of graphs showing laser performance over time for recording heads according to example embodiments.

In FIG. 6, graphs 600-602 show measurements of BER versus laser current for tested drives according to example embodiments. The laser current in these graphs is an operational current Iop that is added to a bias current to obtain a total current LDI that activates the laser. The bias current may be adjusted separately from Iop to account for changes in the laser output, e.g., due to temperature. In these graphs (and other graphs discussed below), BER is expressed as value of the decade of BER and Iop is expressed as input value to a DAC that drives the laser.

In each of the graphs 600-602, a series of curves show BER versus Iop scans for a read/write head of the drive at various hours of operations. The arrows in the graphs 600-602 indicate the trend as age of the heads increase. Generally, the minimum BER increases with age, as does the amount of current needed to maintain a minimum BER. In some cases, the efficiency of the optical components can increase, in which case a subsequent curve could shift to the left, such that less laser current is required to obtain a locally minimum BER.

Figure 7:
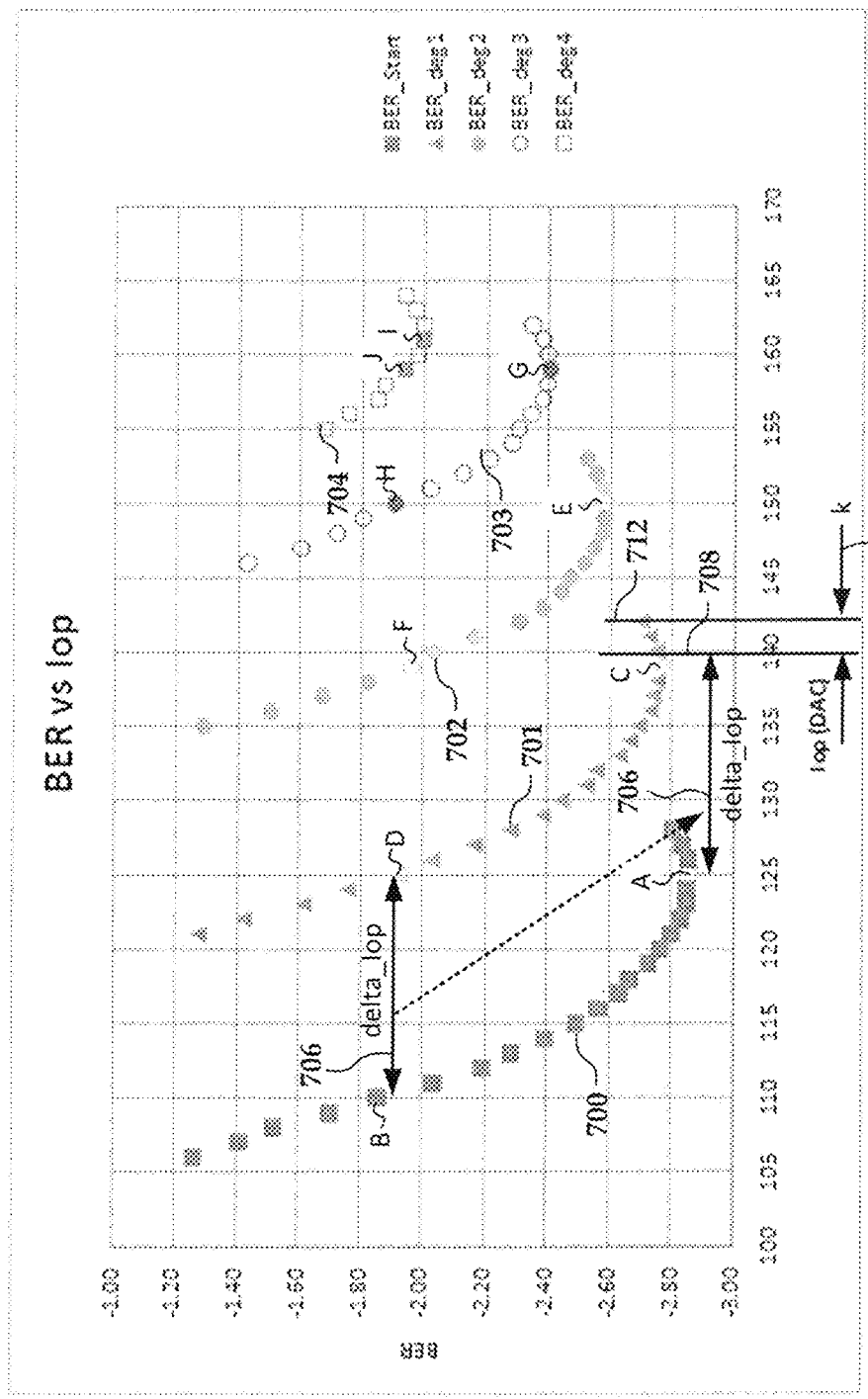
FIG. 7 is a graph showing results of calibration operations performed according to an example embodiment.

In FIG. 7, a graph shows an example of write quality versus laser power functions being used in a laser calibration according to an example embodiment. In this example, the curves represent the function BER(Iop) where BER is used as the measure of write quality and Iop is used as the measure of laser power. Note that BER is inverse to write quality because high BER corresponds low write quality and low BER corresponds to high write quality. Different measures of laser power and/or write quality may be used in other embodiments. Generally, each point on the curves are discrete measurements of the pair (Iop, BER). The data used to form the curves 700-704 is shown in tabular form in FIG. 8. The data of these functions is stored in a persistent memory, e.g., stored as a lookup table, parameters of a curve fit, or other representations and data structures known in the art.

Curve 700 represents an initial laser calibration curve, e.g., after field or factory calibration. Point A is the point on curve 700 with lowest BER (BER_min), and therefore the Iop=125 at Point A as used as the currently-selected operational laser power for recording, Iop_selected. Point A can be expressed as the pair (Iop_selected, BER_min)=(125, −2.856). During operation of the drive, the BER of data written at Iop_selected is monitored, e.g., by reading back recently written user data or test data. It may be assumed that over time BER will increase due to aging of the read/write head. If this increase exceeds a threshold (e.g., BER≥−2.0 in this example) then a laser calibration will be triggered.

When the threshold BER value is satisfied (e.g., current recorded data has BER>=−2.0) the laser calibration will look at the previously measured function of curve 700 for a point with an offset Iop value (Iop_offset) where the associated BER is approximately equal to the threshold BER. This is shown in FIG. 7, as point B, which can be represented as (Iop_offset, BER_limit), where BER_limit is approximately equal to the predefined BER threshold. It will be understood that, because the data of curve 700 may be stored as discrete function, e.g., in a table, that there may not be an entry in the table at exactly the BER threshold. The (Iop_offset, BER_limit) data point is therefore selected based on, e.g., the point with BER closest to the BER threshold, first point with BER exceeding the BER threshold, etc. For purposes of this disclosure, the "first" point with BER exceeding the threshold is that point in the curve/column having the lowest BER value that is still greater than the threshold value.

In this example, the (Iop_offset, BER_limit) is selected based on the first point having BER that exceeds the threshold of −2.0, which is Point B at (110, −1.855). Comparing the Iop values of Points A and B, it can be estimated that the head has degraded by a power difference (delta_Iop 706) having a value of 125−110=15 Iop. Therefore, the upper Iop limit (Iop_max 708) for the calibration will be at least the current default Iop plus the delta_Iop 706, or 125+15=140. To compensate for variations that might exist and ensure that the calibration finds a minimum BER, a small compensation value k 708 could be added to the upper Iop limit 708. The value of k increases the value of Iop_max 710 to ensure that a minimum BER is found in the calibration. Therefore, the equation to compute the upper Iop limit is Iop_max=Iop_selected+delta_Iop+k.

The k value 710 is a dynamic, fine-tuning factor, and may be a fixed value or a percentage of one of the other values, e.g., n % of Iop_selected, m % of delta_Iop, etc. In one embodiment, k is less than or equal to 15% of delta_Iop. The lower laser power limit (Iop_min) for the calibration sweep may be a constant offset, e.g., Iop_min=Iop_selected−LC where LC is a constant value. In this example, LC=4 for all of the calibrations. If the BER threshold that triggers the field laser calibration is different than the −2.0 used in this example, LC may be adjusted accordingly, e.g., decreased where calibration is triggered for BER greater than −2.0. In this case, k=2 and LC=4, such that the next calibration sweeps Iop from Iop_min=125−4=121 and Iop_max=125+15+2=142.

Sweeping Iop from 121 to 142 while recording and reading back the BER provides the results represented by curve 701 in FIG. 7. The numerical results for this sweep 701 are shown in the second and third columns in the table of FIG. 8. After this calibration sweep 701, the new selected operational laser power is found at Point C, where (Iop_selected, BER_min)=(139, −2.756). Thereafter, BER is monitored as before, and after some amount of elapsed write time, the BER drops below −2.0, such that another field laser calibration is triggered. A shown by Point D on curve 701, (Iop_offset, BER_limit)=(125, −1.929). For this next calibration, Iop_min=139−4=135 and Iop_max=139+(139−125)+k=153+k. As can be seen from curve 702, the value of k was set to zero for this calibration, which involved sweeping Iop from 135 to 153. The new Iop_selected is 150 as seen at point E on curve 702. Curves 703 and 704 show two more calibration runs resulting in Iop_selected of 159 and 161 as indicated by Points G and I respectively.

In the example shown in FIGS. 7 and 8, it is assumed the NFT and/or optical path degrades and becomes less efficient over time. However, in some cases the NFT and/or optical path becomes more efficient. To account for this case, during the test that is used to determine whether to calibrate based on quality measure exceeding the threshold, a difference in the write quality metric between a squeezed versus non-squeezed tracks may be performed. Using BER again as the write quality metric, measuring the squeezed BER involves writing a test track, and then writing adjacent tracks at some squeeze amount (e.g., less than or equal to a nominal track pitch). The BER of the test track after this is used as the squeezed BER. The non-squeezed BER involves writing the test track without adjacent tracks (e.g., over previously erased tracks) and measure the test track BER. This can be done using the same test track, e.g., write the test track, measure non-squeezed BER, write the adjacent tracks, measure squeezed BER.

Generally, the difference between squeezed versus non-squeezed BER is 0.35 decades. When the squeezed BER is getting worse, but the non-squeezed BER is getting better (thus the difference is becoming greater), this means that the NFT is getting more efficient. This is generally due to an increase in hotspot size due to the increased efficiency, which can increase adjacent track interference for the squeezed BER measurements. Therefore, if the delta between squeezed and non-squeezed BER exceeds some value (e.g., 0.4), it may be assumed that the calibration curve will have shifted to the left in the graph, e.g., of FIG. 7, and not to the right. Therefore the Iop_max can be set to Iop_selected+k to prevent applying too much power to the NFT.

Generally, a device implementing this procedure may store historical data related to the delta BER, squeezed BER, and/or non-squeezed BER to be used as an indicator that the NFT is degrading or improving. If both the squeezed and non-squeezed BER get better, then a laser calibration will not be triggered, because the monitored BER (whether squeezed, non-squeezed, or both are monitored) in such a case would not approach the BER threshold.

Figure 9:
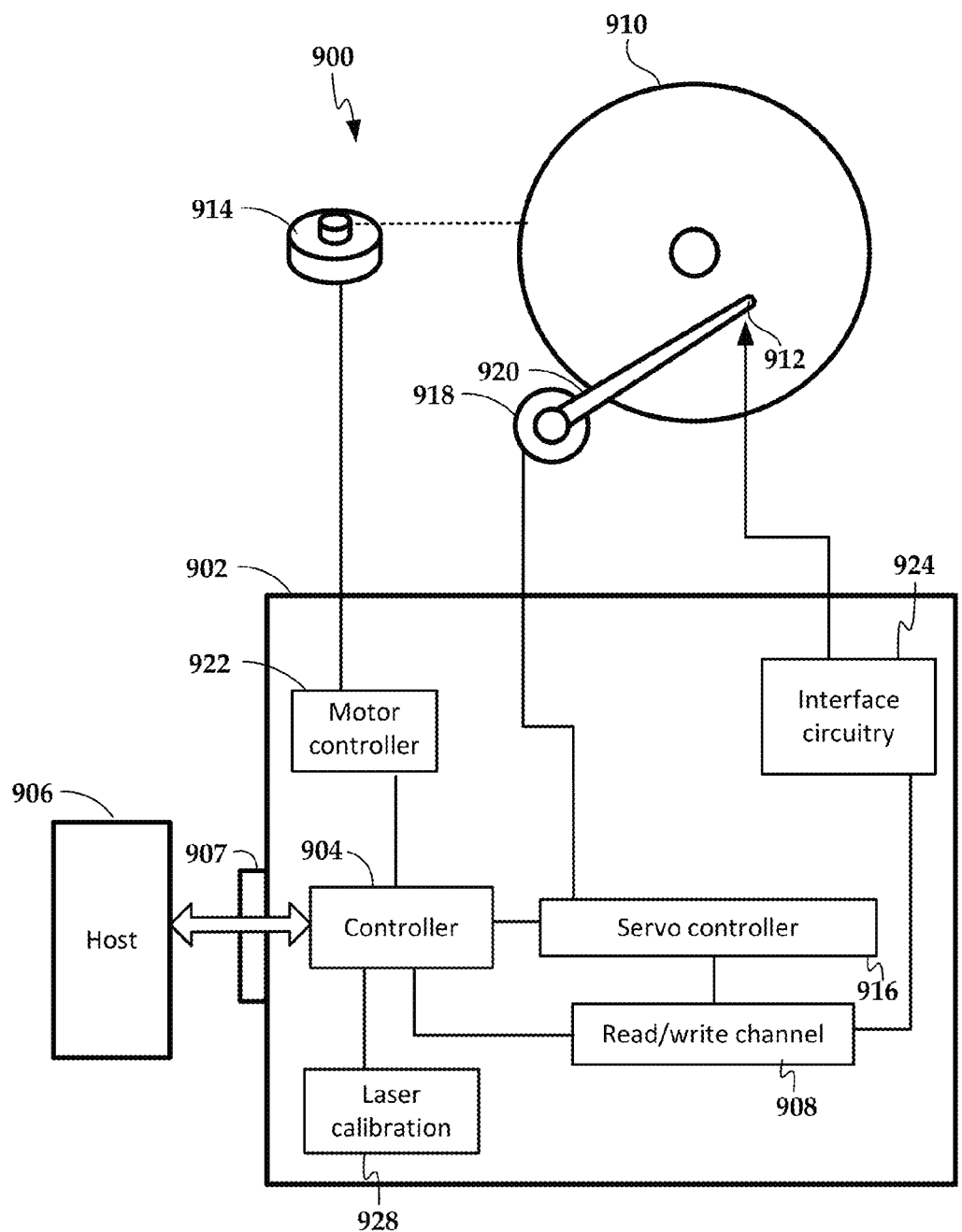
FIG. 9 is a block diagram of an apparatus and system according to an example embodiment.

Generally, the methods described above may be performed in any apparatus that utilizes a HAMR writer and recording medium, including hard disk drives and disk drive test stands. In reference now to FIG. 9, a block diagram illustrates components of system 900 according to an example embodiment. The system 900 includes a HAMR hard drive apparatus 902 having to one or more read/write heads 912. The apparatus 902 includes a system controller 904 that controls a number of functions of the system 900, such as communications between the apparatus 902 and a host device 906 via a host interface 907. The host device 906 may include any electronic device that can be communicatively coupled to communicate with the apparatus 902, e.g., a general-purpose computer, a factory test apparatus, remote terminal, etc.

The system controller 904 may include any combination of custom logic circuits, application specific integrated circuits (ASICs), general-purpose central processing unit (CPU), etc., and may utilize instructions stored as firmware and/or software. The system controller 904 may process instructions to read data from and write data to a recording medium (e.g., disk 910) via a read/write channel 908. The system controller 904 may, among other things, determine a location on the disk 910 for the desired data, move the heads to the location (track) of the data, read or write the data via the read/write channel 908, correct errors, transfer the data to/from the host 906, etc.

The read/write channel 908 converts data between the digital signals processed by the data controller 904 and the analog signals conducted through read/write heads 912. The read/write channel 908 also provides servo data read from the disk 910 to a servo controller 916. The servo controller 916 uses these signals to drive an actuator 918 (e.g., voice coil motor) that rotates an arm 920, upon which the read/write heads 912 are mounted. The heads 912 are moved radially across different tracks of the disk(s) 910 by the actuator motor 918 (e.g., voice coil motor), while a spindle motor 914 rotates the disk(s) 910. A microactuator (not shown) may also be included to provide finer tracking control, and also receives inputs from the servo controller 916. The controller 904 controls the spindle motor 914 by way of a motor controller 922.

During write operations, the read/write channel 908 provides analog signals that are delivered to the read/write heads 912 by way of interface circuitry 924. The interface circuitry 924 include hardware components (preamplifiers, filters, analog-to-digital converters, digital-to-analog converters) that condition the signals sent to and received from the read/write heads 912. In the illustrated embodiment, the interface circuitry 924 also includes laser control circuitry that energizes a laser (or other energy source) at each of the read/write heads 912 during write operations. The laser control circuitry conditions the signals to ensure the lasers provide sufficient energy to heat a spot on the disk 910 as it is being recorded. Other signals sent to or received from the read/write head 912 may also be conditioned via the preamplifier, such as heater control signals, sensor signals, etc.

A laser calibration module 928 may perform data collection and testing to determine write quality metrics. For example, the laser calibration module 928 may record the results of a laser calibrations as a functions of BER versus laser power, and store the functions as tables, curve fit parameters, etc. Operational laser power can be selected from a first point in the function having a minimum BER. During operation of the drive subsequent to a first laser calibration, the laser calibration module 928 monitors a tested BER of data recorded by the read/write head 912, e.g., by writing and reading back squeezed and/or non-squeezed test tracks, by validating user data, etc.

If the tested BER is above a threshold, the laser calibration module 928 performs a subsequent laser calibration that involves sweeping from a minimum laser power to a maximum laser power within a single track of the recording medium. The maximum laser power is equal to the operational laser power from the previous calibration function plus a difference between the operational laser power and an offset laser power at a second point in the previous calibration function. The BER of the second point in the function is greater than or equal to the threshold. The operational laser power is changed by the laser calibration module 928 to correspond to a second minimum BER found during the second laser calibration.

Figure 10:
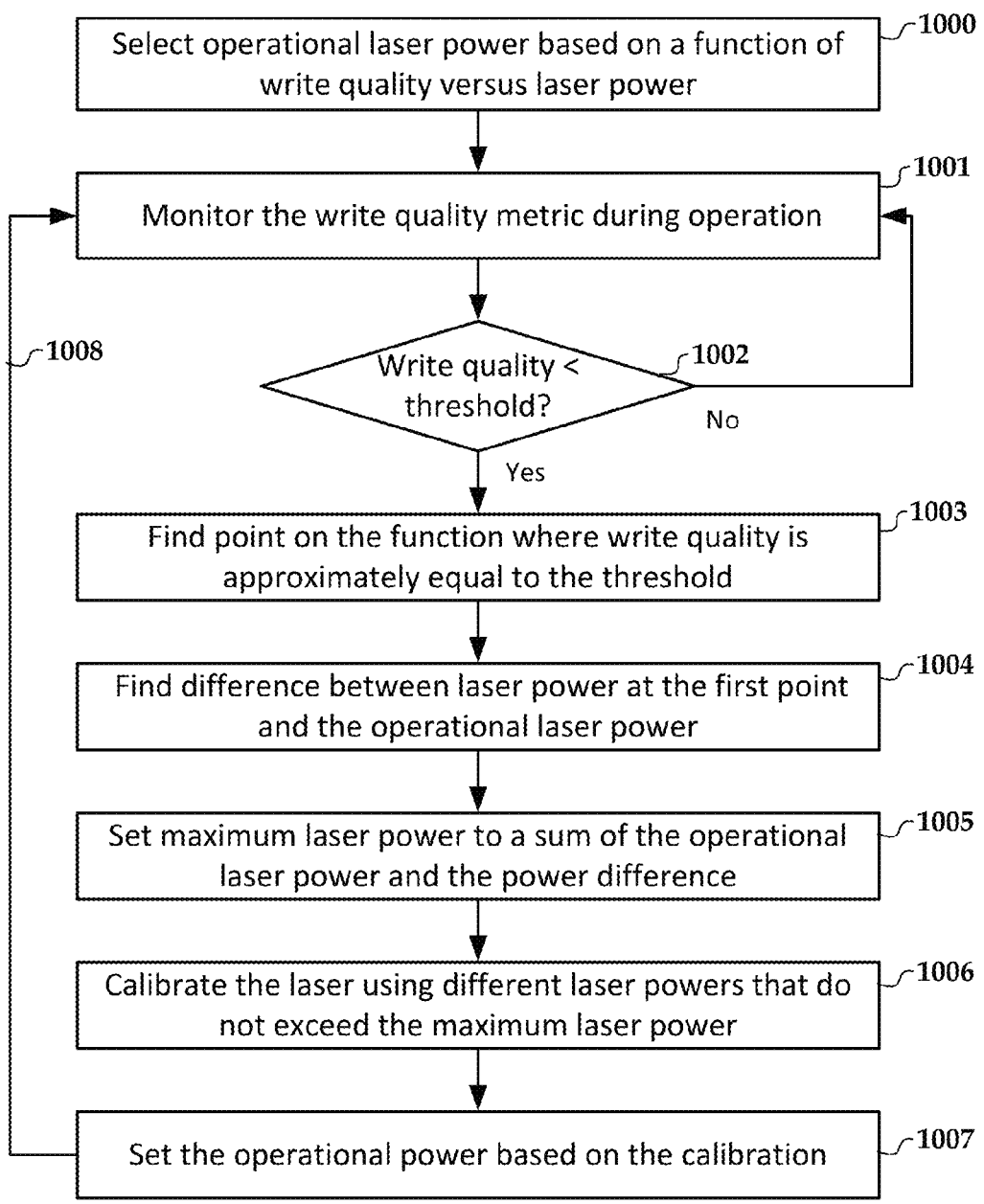
FIGS. 10 and 11 are flowcharts of methods according to example embodiments.

In FIG. 10, a flowchart illustrates a method according to another example embodiment. The method involves selecting 1000 an operational laser power based on a first function of a write quality metric versus laser power for a heat-assisted, magnetic recording head. The first function may be from a field or factory calibration of the recording head. The operational laser power is used for recording data to a magnetic recording medium.

The write quality metric of data written to the magnetic recording medium at the selected, operational laser power is monitored 1001 during operation of the recording head, e.g., at regular intervals, in response to read errors or other triggers, etc. If it is determined 1002 that the write quality metric satisfies a threshold (e.g., write quality is below a threshold, BER is above a threshold), a point of the first function is found 1003 where the write quality metric is approximately equal to the threshold. A power difference between the operational laser power and an offset laser power value at the point is found 1004. A maximum laser power for a calibration operation is set 1005. The maximum laser power is the sum of the selected laser power and the power difference.

The calibration 1006 is performed, which involves applying different laser powers to the recoding head to select a new laser power that improves the quality metric. The different laser powers do not exceeding the maximum laser power. The operational power is set 1007 to the new power based on the calibration. Thereafter, this can be repeated as indicated by path 1008, with the data from the last calibration at block 1006 being used as the function referenced at block 1003.

Figure 11:
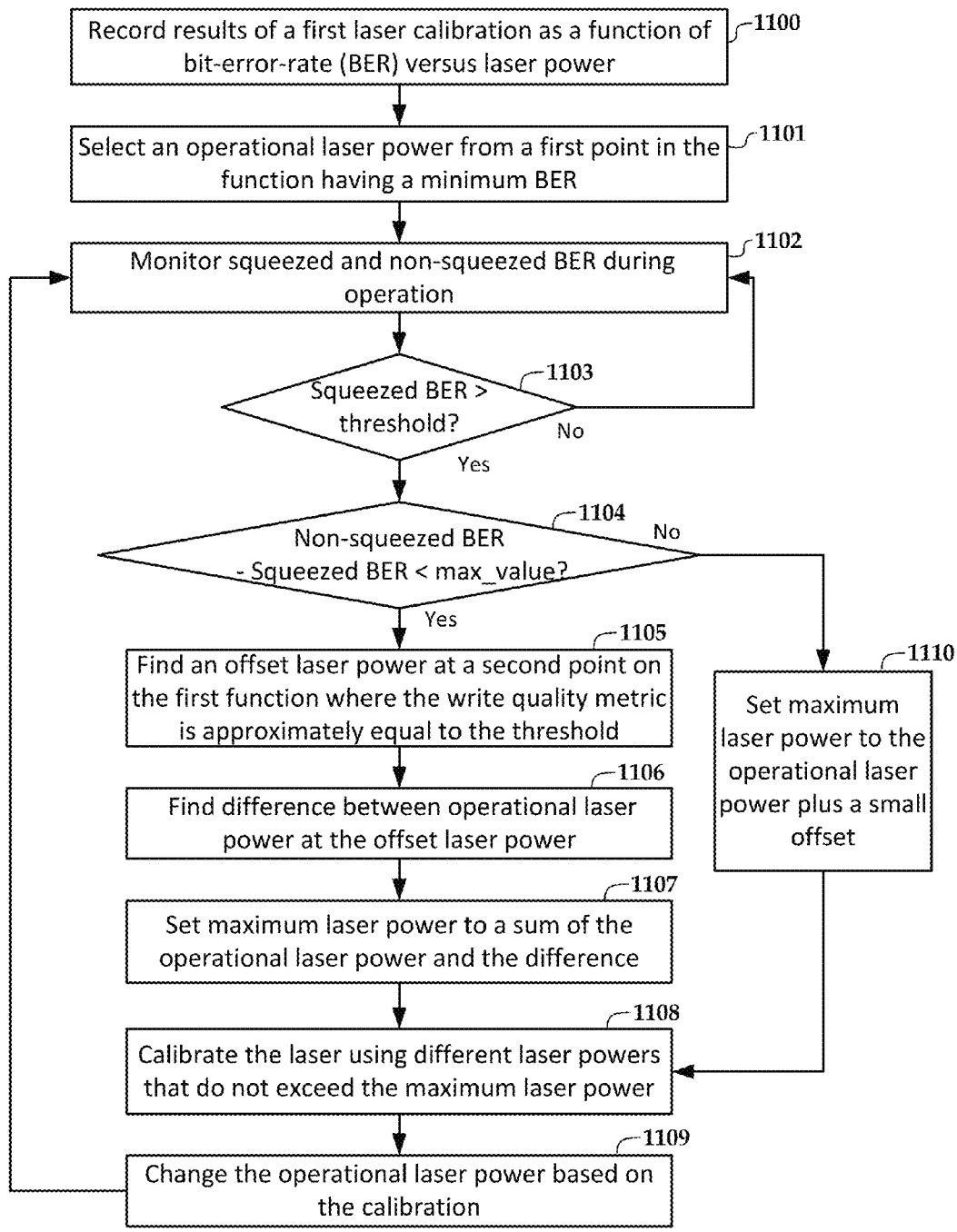

In FIG. 11, a flowchart illustrates a method according to another example embodiment. The method involves recording 1000 recording results of a first laser calibration as a function of BER versus laser power for a heat-assisted, magnetic recording head of a drive. An operational laser power is selected 1101 from a first point in the function having a minimum BER. During operation of the drive subsequent to the first laser calibration, squeezed and non-squeezed BER of data recorded by the recording head to a recording medium is monitored 1102.

If it is determined 1103 that the squeezed BER is above a threshold, and also determined 1104 that the difference between the non-squeezed and squeezed BER is less than a maximum value, an offset laser power is found 1105. The offset laser power is at a second point in the function where BER is greater than or equal to the threshold. A difference between the operational laser power of the first point in the function and the offset laser power of the second point in the function is found 1106. A maximum laser power is set 1107 to the operational laser power plus the difference.

The laser is calibrated 1108 by sweeping through different laser powers within a single track of the recording medium. The different laser powers do not exceed the maximum laser power. The operational laser power is changed 1109 to correspond to a second minimum BER found during the second laser calibration. If the determination at block 1104 is that the difference between the non-squeezed and squeezed BER is greater than or equal to the maximum value, then the maximum laser power is set 1110 to the operational laser power plus a small offset, and the calibration 1108 and changing 1109 of the operational laser power proceeds as described above.

The various embodiments described above may be implemented using circuitry and/or software modules that interact to provide particular results. One of skill in the computing arts can readily implement such described functionality, either at a modular level or as a whole, using knowledge generally known in the art. For example, the flowcharts illustrated herein may be used to create computer-readable instructions/code for execution by a processor. Such instructions may be stored on a non-transitory computer-readable medium and transferred to the processor for execution as is known in the art.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. A method, comprising:
   selecting an operational laser power based on a first function of a write quality metric versus laser power for a heat-assisted, magnetic recording head, the operational laser power being used for recording based on the function;
   monitoring the write quality metric of data written to a magnetic recording medium at the operational laser power;
   responsive to the write quality metric satisfying a threshold, determining a power difference between the operational laser power and an offset laser power, the offset laser power corresponding to a point of the first function where the write quality metric is approximately equal to the threshold;
   setting a maximum laser power for a calibration operation, the maximum laser power comprising a sum of the operational laser power and the power difference; and
   applying different laser powers to the recoding head during the calibration operation to select a new laser power that improves the quality metric, the different laser powers not exceeding the maximum laser power.

2. The method of claim 1, wherein the calibration operation comprises:
   selecting a set of consecutive user data wedges within a single track of the magnetic recording medium, the consecutive user data wedges each located between consecutive servo marks;
   writing test data to at least every other one of the consecutive user data wedges using one of the different laser powers for each wedge;
   reading the test data from the at least every other one of the consecutive user data wedges via the read/write head; and
   selecting the new laser power based on reading the test data.

3. The method of claim 1, wherein the calibration involves sweeping the laser power from a minimum power to the maximum power while recording data, the minimum power determined based on a constant offset from the operational laser power.

4. The method of claim 3, wherein the sweeping of the laser power involves setting the laser power to two or more different values during one rotation of the recording medium.

5. The method of claim 1, wherein the first function comprises a discrete function, and wherein the laser power corresponds to a point in the function having a highest value of the quality metric that is below the threshold quality metric.

6. The method of claim 1, wherein monitoring the write quality metric comprises measuring a delta of the quality metric between squeezed and non-squeezed tracks, and responsive to the delta exceeding a value, setting the maximum laser power, instead of to the sum of the operational laser power and the power difference, to the operational laser power plus a fine-tuning factor, the fine-tuning factor being less than or equal to 15% of the power difference.

7. The method of claim 1, wherein the maximum laser power comprises the sum plus a fine-tuning factor, the fine-tuning factor being less than or equal to 15% of the power difference.

8. The method of claim 1, wherein the write quality metric comprises bit-error-rate.

9. The method of claim 1, further comprising storing the results of the calibration operation as a second function of the write quality metric versus the laser power, the second function being used to set the maximum laser power for a second calibration if the write quality metric subsequently satisfies the threshold.

10. The method of claim 1, wherein the first function is obtained via a previous run of the calibration operation on the recording head.

11. A method comprising:
    recording results of a first laser calibration as a function of bit-error-rate (BER) versus laser power for a recording head of a drive;
    selecting an operational laser power from a first point in the function having a minimum BER;
    during operation of the drive subsequent to the first laser calibration, monitoring a tested BER of data recorded by the recording head to a recording medium;
    responsive to the tested BER being above a threshold, performing a second laser calibration that involves sweeping through different laser powers within a single track of the recording medium, the different laser powers not exceeding a maximum laser power that comprises the operational laser power plus a difference between the operational laser power and an offset laser power of a second point in the function, a BER of the second point in the function being greater than or equal to the threshold; and
    changing the operational laser power to correspond to a second minimum BER found during the second laser calibration.

12. The method of claim 11, wherein the second laser calibration comprises:
    selecting a set of consecutive user data wedges within the single track, the consecutive user data wedges each located between consecutive servo marks;
    writing test data to at least every other one of the consecutive user data wedges while sweeping from the minimum laser power to the maximum laser power in no more than one rotation of the recording medium;
    reading the test data from the at least every other one of the consecutive user data wedges via the recording head; and changing the operational laser power based on reading the test data.

13. The method of claim 11, further comprising storing the results of the second laser calibration operation as a second function of the BER versus the laser power, the second function being used to set the maximum laser power for a third calibration if the tested BER is above the threshold subsequent to the second laser calibration.

14. The method of claim 11, wherein monitoring the tested BER comprises measuring a delta between a squeezed BER and a non-squeezed BER, wherein if the delta exceeds a value, the maximum laser power comprises, instead of the operational laser power plus the difference, the operational laser power plus a fine-tuning factor, the fine-tuning factor being less than or equal to 15% of the power difference.

15. The method of claim 11, wherein the maximum laser power comprises a sum of the operational laser power, the difference, and a fine-tuning factor, the fine-tuning factor being less than or equal to 15% of the power difference.

16. An apparatus comprising:
circuitry operable to communicate with a recording head comprising a laser, the recording head reading from and writing to a magnetic recording medium; and
a processor coupled to the circuitry and configured to:
record results of a first laser calibration of the recording head as a function of bit-error-rate (BER) versus laser power;
select an operational laser power for the recording head from a first point in the function having a minimum BER;
during operation of the apparatus subsequent to the first laser calibration, monitor a tested BER of data recorded by the recording head to the magnetic recording medium;
responsive to the tested BER is being above a threshold, perform a second laser calibration that involves sweeping through different laser powers within a single track of the magnetic recording medium, the different laser powers not exceeding a maximum laser power that comprises the operational laser power plus a difference between the operational laser power and an offset laser power of a second point in the function, a BER of the second point in the function being greater than or equal to the threshold; and
change the operational laser power to correspond to a second minimum BER found during the second laser calibration.

17. The apparatus of claim 16, wherein the second laser calibration comprises:
selecting a set of consecutive user data wedges within the single track, the consecutive user data wedges each located between consecutive servo marks;
writing test data to at least every other one of the consecutive user data wedges while sweeping from the minimum laser power to the maximum laser power in no more than one rotation of the recording medium;
reading the test data from the at least every other one of the consecutive user data wedges via the recording head; and
changing the operational laser power based on reading the test data.

18. The apparatus of claim 16, where the processor further stores the results of the second laser calibration operation as a second function of the BER versus the laser power, the second function being used to set the maximum laser power for a third calibration if the tested BER is above the threshold subsequent to the second laser calibration.

19. The apparatus of claim 16, wherein monitoring the tested BER comprises measuring a delta between a squeezed BER and a non-squeezed BER, and responsive the delta exceeding a value, the maximum laser power comprises, instead of the operational laser power plus the difference, the operational laser power plus a fine-tuning factor, the fine-tuning factor being less than or equal to 15% of the power difference.

20. The apparatus of claim 16, wherein the maximum laser power comprises a sum of the operational laser power, the difference, and a fine-tuning factor, the fine-tuning factor being less than or equal to 15% of the power difference.

* * * * *